United States Patent
Fröhlich et al.

(10) Patent No.: US 8,053,518 B2
(45) Date of Patent: Nov. 8, 2011

(54) POLYESTER HYBRID RESINS

(75) Inventors: Gerd Fröhlich, Graz (AT); Edmund Urbano, Graz (AT)

(73) Assignee: Cytec Austria GmbH, Werndorf (AT)

( * ) Notice: Subject to any disclaimer, the term of this patent is extended or adjusted under 35 U.S.C. 154(b) by 55 days.

(21) Appl. No.: 12/676,162

(22) PCT Filed: Sep. 1, 2008

(86) PCT No.: PCT/EP2008/061468
§ 371 (c)(1), (2), (4) Date: Mar. 3, 2010

(87) PCT Pub. No.: WO2009/030653
PCT Pub. Date: Mar. 12, 2009

(65) Prior Publication Data
US 2010/0171238 A1    Jul. 8, 2010

(30) Foreign Application Priority Data
Sep. 3, 2007 (EP) .................................. 07017211

(51) Int. Cl.
*C08L 75/06* (2006.01)
(52) U.S. Cl. .......... 525/28; 525/440; 525/454; 525/455; 264/240; 264/328.8
(58) Field of Classification Search ............ 525/28, 525/440, 454, 455; 264/240, 328.8
See application file for complete search history.

(56) References Cited

U.S. PATENT DOCUMENTS

| | | | | |
|---|---|---|---|---|
| 4,822,849 A | * | 4/1989 | Vanderlaan | 525/17 |
| 5,153,261 A | * | 10/1992 | Brooks | 525/28 |
| 5,286,832 A | * | 2/1994 | Verleg et al. | 528/75 |
| 5,296,544 A | * | 3/1994 | Heise et al. | 525/28 |
| 5,296,545 A | * | 3/1994 | Heise | 525/28 |
| 5,393,829 A | * | 2/1995 | Verleg et al. | 525/28 |
| 5,426,140 A | * | 6/1995 | Fekete et al. | 524/2 |
| 6,093,771 A | | 7/2000 | Wünsch et al. | |
| 2008/0114132 A1 | * | 5/2008 | Daly et al. | 525/329.5 |

FOREIGN PATENT DOCUMENTS

| | | |
|---|---|---|
| EP | 0371221 A2 | 6/1990 |
| EP | 0441416 B1 | 6/1995 |

OTHER PUBLICATIONS

International Search Report of PCT/EP2008/061468, Dec. 2008.
Written Opinion of PCT/EP2008/061468, Dec. 2008.

* cited by examiner

*Primary Examiner* — Bernard Lipman
(74) *Attorney, Agent, or Firm* — Charles E. Bell

(57) ABSTRACT

This invention relates to a polyester urethane hybrid resin casting resin composition which comprises a mixture ABCD of an unsaturated polyester ABC which has moieties derived from at least one alcohol A, moieties derived from a mixture B of carboxylic acids, wherein at least 10% of the mass of at least one of the said carboxylic acids B or of the said alcohols A have at least one olefinic unsaturation in their molecules, and moieties derived from a monoepoxide C having at least four carbon atoms, which polyester ABC is dissolved in a compound D, and which has at least one olefinic unsaturation and which is radically copolymerizable with the unsaturated polyester oligomer ABC and a second liquid component EF comprising a polyfunctional isocyanate E and a radical initiator F, a process for its production, and a method of use thereof to form large moulded parts.

10 Claims, No Drawings

POLYESTER HYBRID RESINS

This application is the U.S. National Phase application of International Application No. PCT/EP2008/061468, filed Sep. 1, 2008 and published as WO 2009/030653, which claims benefit of priority from European Patent Application No. 07017211.9, filed Sep. 3, 2007, each of which is incorporated by reference herein in its entirety.

The present invention relates to polyester hybrid resins, especially to casting resins.

Polyester hybrid resins have been described, i. a., in EP 0 371 221 A2. Such polyester hybrid resins are based on mixtures of hydroxy functional unsaturated oligoesters or polyesters with low degree of polymerisation dissolved in olefinically unsaturated copolymerisable compounds as reactive solvents, such as styrene and methyl methacrylate, and di- and polyisocyanates. Unsaturation is preferably introduced into the polyesters by incorporation of olefinically unsaturated dicarboxylic acids such as maleic or fumaric acids. Formation of the crosslinked polymer occurs via radically initiated copolymerisation of the unsaturated solvent and the polyester, on the one hand, and via polyaddition of the hydroxy functional polymers to the diisocyanate. This dual cure leads to advantageous properties. However, it has been found that especially in manufacturing large parts such as boat bodies or swimming pool parts, curing speed is too high to allow casting of such large parts.

In the prior art cited supra, it has been confirmed that secondary hydroxyl group containing polyesters are preferred due to the delay of the polyaddition reaction which is needed to provide the user with a reasonable pot life. On the other hand, polyesterification of secondary alcohols is much slower compared to that of primary alcohols, thus making the formation of the basic polyester component more time-consuming and less efficient.

In EP 0 371 221 A2, it has therefore been proposed to start from a polyester made by alcoholysis of polyethylene terephthalate with alcohols that have both primary and secondary hydroxyl groups, such as 1,2-dihydroxy propane and the polyethers based thereon. This has the advantage that cheap raw materials (polyester scrap) may be used, but the drawback is the two stage process of alcoholysis and reesterification which is needed to incorporate the amount of unsaturated acid needed. There is also a statistical distribution of primary and secondary hydroxyl groups, which leads to a pot life which is still not satisfactory.

It is therefore the object of the present invention to provide polyester hybrid resins with reduced curing speed, which retain, however, the favourable properties of such hybrid resins as good tensile strength and modulus, high Izod impact strength and heat distortion temperature. It was another object of the present invention to provide a hybrid resin that allows a high degree of filling and a high versatility in composition.

This and other objects have been achieved by providing a two-pack polyester urethane hybrid resin casting resin composition which comprises as a first constituent, a mixture ABCD of an unsaturated polyester ABC which has moieties derived from at least one alcohol A, moieties derived from a mixture B of carboxylic acids, wherein at least 10% of the mass of at least one of the said carboxylic acids B or of the said alcohols A have at least one olefinic unsaturation in their molecules, and moieties derived from a monoepoxide C having at least four carbon atoms, which polyester ABC is dissolved in a compound D which has at least one olefinic unsaturation and which is radically copolymerisable with the unsaturated polyester oligomer ABC and as a second constituent, a liquid component EF comprising a polyfunctional isocyanate E and a radical initiator F.

In a preferred embodiment, the unsaturated polyester AB is the product of a polyesterification of at least one alcohol A and at least one carboxylic acid B, wherein at least 10%, preferably at least 15%, and particularly preferred, at least 20% of the mass of the acids B, of the alcohols A, or of both the acids B and of the alcohols A, have at least one olefinic unsaturation in their molecules, such unsaturated acids being referred to as unsaturated acids B1, and such unsaturated alcohols being referred to as unsaturated alcohols A1, optionally in the presence of a catalyst, and wherein the amount of alcohols A and acids B are chosen in a way to ensure that the resulting polyester AB has an acid number of preferably at least 15 mg/g, particularly preferred of at least 25 mg/g, and especially preferred of at least 35 mg/g. In this reaction product ABC, the amount of monoepoxide C is chosen such that substantially all of the carboxyl end groups of AB are converted by reaction with C under addition and ester formation to hydroxyl end groups, which are almost exclusively secondary hydroxyl groups. In this context, "almost exclusively" means that at least 90%, preferably at least 95%, and particularly preferred, at least 97% of the items in question obey the stated condition, in this case, of being secondary hydroxyl groups, and "substantially all" means at least 90%, preferably at least 95%, and particularly preferred, at least 97% of the items in question.

The hydroxy functional polyester oligomer ABC formed by the reaction of AB and C is then dissolved in a liquid compound D which has at least one olefinic unsaturation and which is radically copolymerisable with the unsaturated polyester oligomer ABC. In another embodiment, it is also possible to dissolve the polyester AB in the liquid component D, and to react this solution with the monoepoxide C.

In a preferred embodiment, a catalyst G is also present in this first component, which catalyst G serves to enhance the radical formation in the second component which comprises a polyfunctional isocyanate E and a radical initiator F.

The two components, the first being a solution of the polyester AB reacted with the monoepoxide C in compound D as a solvent, optionally also comprising the catalyst G, and the second being a mixture of a polyfunctional isocyanate E and a radical initiator F, are mixed to form a casting resin composition. This composition is usually prepared at most 3 hours prior to use.

The alcohols A have at least two hydroxyl groups and are aliphatic linear, branched or cyclic hydroxy compounds having from 2 to 40 carbon atoms, preferably selected from the group consisting of ethylene glycol, 1,2- and 1,3-propylene glycol, 1,2- and 1-4-butane diol, 1,2-, 1,5- and 1,6-hexane diol, diethylene glycol, triethylene glycol, dipropylene glycol, tripropylene glycol, and higher oligomers of ethylene and propylene glycol which may also include mixed oligomers.

Preferred are dihydric alcohols A2 such as ethylene glycol, 1,2-propylene glycol, diethylene glycol, dipropylene glycol, neopentyl glycol, and 1,3- and 1,4-butane diol. Among the mixed aromatic-aliphatic alcohols, ethoxylated and propoxylated bisphenol A are preferred. A minor quantity of trihydric or polyhydric alcohols A3 with three or more hydroxyl groups may be present in a mixture with dihydric alcohols, where the mass fraction of tri- or polyhydric alcohols in the mixture of alcohols is not more than 40%, preferably not more than 30%. Such trihydric or polyhydric alcohols A3 are preferably those having both primary and secondary hydroxyl groups. The primary hydroxyl groups are usually consumed during the polyesterification reaction, with the less reactive secondary hydroxyl groups remaining behind. Such alcohols A3 are preferably glycerol having two primary and one secondary hydroxyl groups, erythritol and threitol having each two secondary hydroxyl groups in addition to two primary hydroxyl groups, xylitol having two primary and three secondary hydroxyl groups, and mannitol and sorbitol having two primary and four secondary hydroxyl groups.

The unsaturated alcohols A1 that can be used have at least two hydroxyl groups and are aliphatic linear, branched or cyclic hydroxy compounds having from 2 to 40 carbon atoms and at least one olefinic unsaturation. Preferred alcohols A1 are butene-2-diol-1,4,and partial esters of polyhydric alcohols with unsaturated carboxylic acids, such as trimethylolpropane mono(meth)acrylate or pentaerythritol di(meth) acrylate as well as partial ethers of polyhydric alcohols with unsaturated monohydric alcohols, such as trimethylol propane monoallyl ether or pentaerythritol diallyl ether.

The acids B preferably comprise a portion of acids B1 which have at least one olefinic unsaturation per molecule, and other acids B2 which do not have such olefinic unsaturation. The acids B1 are preferably selected from the group consisting of maleic acid, fumaric acid, itaconic acid, tetrahydrophthalic acid, endomethylene tetrahydrophthalic acid, and hexachloro endomethylene tetrahydrophthalic acids. The acids B2 comprise aliphatic linear, branched and cyclic acids, and aromatic acids having each from 2 to 40 carbon atoms, preferably selected from the group consisting of suberic acid, glutaric acid, adipic acid, dodecane dioic acid, dimeric fatty acids, phthalic, isophthalic and terephthalic acid, 2,3- and 2,6-naphthalene dicarboxylic acids, hexahydrophthalic acid and 1,4-cyclohexane dicarboxylic acid.

Suitable monoepoxides C are epoxyalkanes such as 1,2-epoxybutane and 1,2-epoxy hexane, ethers of glycidyl alcohol with aliphatic linear or branched alcohols such as ethanol, butanol-1,hexanol-1, and 2-ethyl hexanol-6,as well as esters of glycidyl alcohol with monocarboxylic acids such as acetic acid, caproic acid, 2-ethylhexanoic acid or 2,2-dimethyloctanoic acid. Especially preferred are esters of glycidyl alcohol with branched aliphatic acids which are commercially available under the trade name of "®Versatic Acids". It is also possible to use methylglycidyl alcohol in mixture with or instead of glycidyl alcohol in the compounds named herein.

Suitable compounds D are vinyl aromatic compounds such as styrene, alpha-methyl styrene, vinyl toluene, divinyl benzene, vinyl naphthalene, and also esters of $C_1$- to $C_6$-aliphatic linear or branched alcohols, such as methanol, ethanol, propanol, butanol, hexanol and 2-ethyl hexanol, with unsaturated mono- or dicarboxylic acids such as acrylic, methacrylic, crotonic, isocrotonic, vinyl acetic acids, and maleic, fumaric, itaconic, mesaconic, citraconic, and tetrahydrophthalic acids. Likewise, diallyl phthalate and triallyl cyanurate can also be used. It is also possible to use esters of dihydric or polyhydric alcohols with the acids mentioned supra, such as hydroxyethyl (meth)acrylate, hydroxypropyl (meth)acrylate, ethylene- or propylene-glycol di(meth)acrylate, and trimethylolpropane di- or tri-(meth)acrylate, as well as ethers of di- and polyhydric alcohols with unsaturated monohydric alcohols, such as trimethylol propane mono-, di- and triallyl ether or pentaerythritol mono-, di-, tri- and tetraallyl ether. When determining the amount of isocyanate to be used, the presence of such hydroxy functional compounds D must be taken into account.

The isocyanates E can be selected from the group consisting of difunctional or polyfunctional aliphatic and aromatic isocyanates, preferably difunctional isocyanates, such as toluylene diisocyanate, bis-(4-isocyanatophenyl) methane, hexamethylene diisocyanate, isophorone diisocyanate, tetramethylxylylene diisocyanate, bis-(4-isocyanatocyclohexyl) methane, and allophanates, uretdiones, isocyanurates and biurets derived from these.

Radical initiators F can be selected from peroxide compounds such as tert.butyl perhexanoate, tert.butyl perbenzoate, and dibenzoyl peroxide, which are preferably combined with aromatic amines as catalysts G such as N,N-dimethyl or N,N-diethyl aniline, and ketone hydroperoxides such as methyl ethyl ketone hydroperoxide, acetylacetone hydroperoxide and cyclohexanone hydroperoxide, in combination with metal salts as catalysts G, preferably salts of organic acids, and particularly preferred, salts of transition metals with organic acids such as cobalt or vanadium octanoate or naphthenate.

The invention further relates to a process for the preparation of a two-pack polyester urethane hybrid resin casting resin process for the production of a two-pack polyester urethane hybrid casting resin composition, comprising the steps of reacting at least one alcohol A and a mixture B of carboxylic acids wherein at least 10% of the mass of at least one of the said carboxylic acids B or of the said alcohols A have at least one olefinic unsaturation in their molecules, to form an unsaturated polyester AB, reaction of the acidic unsaturated polyester AB formed in the first step with a monoepoxide C having at least four carbon atoms, to form a hydroxy functional polyester oligomer ABC, dissolving the polyester ABC in a liquid compound D which has at least one olefinic unsaturation and which is radically copolymerisable with the unsaturated polyester oligomer ABC, to form a mixture ABCD, preparing as a second component, a liquid isocyanate composition EF which comprises a polyfunctional isocyanate E and a radical initiator F, adding this liquid isocyanate composition EF to this mixture ABCD to form a casting resin composition.

Optionally, a catalyst is used in the esterification reaction between components A and B. This catalyst is a usual polyesterification catalyst, preferably based on oxides or salts of transition metals, such as titanium, or of oxides or salts group IV or group V metals such as germanium, tin, lead, and bismuth.

It is possible to react the acidic polyesters AB with the monoepoxide C, and then diluting the reaction product ABC with the compound D. In another embodiment which is particularly useful if higher molar mass polyesters AB are synthesised, it is also possible to dilute these polyesters AB with the compound D, and then reacting this lower viscosity solution with the monoepoxide C, in each case providing a solution ABCD.

In a preferred embodiment, a catalyst G is then added to this solution ABCD to form a solution ABCDG, which catalyst G serves to promote radical formation in the second component which comprises a polyfunctional isocyanate E and a radical initiator F.

The two components, the first component being the solution ABCD, or optionally, the solution ABCDG is finally mixed with the second component EF being a mixture of a polyfunctional isocyanate E and a radical initiator F, to form a casting resin composition. This composition is usually prepared at most 3 hours prior to use.

The invention also relates to a method of use of the polyester urethane hybrid resins for the production of shaped objects, which method comprises mixing the first component ABCD which optionally comprises an additional catalyst G, with the second component EF, and casting the mixture thus obtained into a mould, heating the mould to cure the contents of the mould to form a cured part, and then opening the mould and removing the cured part.

The invention is further illustrated by the following examples. The acid number is defined, according to DIN EN ISO 2114 (DIN 53 402), as the ratio of that mass $m_{KOH}$ of potassium hydroxide which is needed to neutralise the sample under examination, and the mass $m_B$ of this sample; its customary unit is "mg/g". Concentrations are mass fractions, if not otherwise denoted, and are stated as the ratio of the mass of solute to the mass of solution, in "cg/g" or "kg/(100 kg)", or "%".

EXAMPLE 1

A mixture of dipropylene glycol (1.33 kg) and neopentyl glycol (0.95 kg), 1 kg of phthalic anhydride and 0.8 kg of maleic anhydride, and 0.55 g of dibutyl tin oxide were mixed in a resin kettle and heated under a light flow of nitrogen until water started to distil. Water was separated continuously while raising the kettle temperature up to 205° C. so that the temperature in the distillation head was kept at from 100° C. to 105° C. for about 20 hours. The residual acid number was about 36 mg/g. The mixture was allowed to cool to 180° C., and 0.52 kg of ®Cardura E 10 (glycidyl ester of a mixture of branched aliphatic decanoic acids) was added over a period of thirty minutes. Thereafter, 0.3 g of hydroquinone dissolved in 1 ml of methoxypropanol were added, and the mixture was allowed to cool to 130° C. 1.62 kg of styrene were added, followed by a second portion of inhibitor (0.25 g of hydroquinone dissolved in 1.3 ml of methoxypropanol). A viscous liquid with a mass fraction of solids of about 73% was obtained. The acid number was about 1 mg/g.

To this liquid, more hydroquinone dissolved in methoxypropanol and N,N-diethyl aniline were added to yield a mixture that contained 0.05 g of hydroquinone, 0.2 g of methoxypropanol, and 0.7 g of diethyl aniline per 100 g of solid resin.

EXAMPLE 2

A mixture was prepared from 1.0 kg of bis-(4-isocyanatophenyl) methane and 97 g of dibenzoyl peroxide as a 50% strength composition (peroxide in powder form together with dicyclohexyl phthalate as retarding or phlegmatisation agent).

EXAMPLE 3

23 g of the mixture of Example 2 and 100 g of the mixture of Example 1 were intimately mixed. The mixture had a pot life of 90 minutes at 23° C.

EXAMPLE 4 (COMPARATIVE)

A mixture of diethylene glycol (1.3 kg) and neopentyl glycol (1.18 kg), 1 kg of phthalic anhydride and 1 kg of maleic anhydride, and 0.55 g of dibutyl tin oxide were mixed in a resin kettle and heated under a light flow of nitrogen until water started to distil. Water was separated continuously while raising the kettle temperature up to 200° C. so that the temperature in the distillation head was kept at from 100° C. to 105° C. for about 13 hours. The residual acid number was about 25 mg/g. The mixture was allowed to cool to 180° C., 0.3 g of hydroquinone dissolved in 1 ml of methoxypropanol were added, and the mixture was then allowed to cool to 130° C. 1.77 kg of styrene were added, followed by a second portion of inhibitor (0.25 g of hydroquinone dissolved in 1.0 ml of methoxypropanol). A viscous liquid with a mass fraction of solids of about 70% was obtained. The acid number was about 17 mg/g.

To this liquid, more hydroquinone dissolved in methoxypropanol and N,N-diethyl aniline were added to yield a mixture that contained 0.05 g of hydroquinone, 0.2 g of methoxypropanol, and 0.7 g of diethyl aniline per 100 g of solid resin.

EXAMPLE 5 (COMPARATIVE)

23 g of the mixture of Example 2 and 100 g of the mixture of Example 4 were intimately mixed. The mixture had a pot life of twenty-five minutes at 23° C.

COMPARATIVE EXAMPLE 6

According to EP 0 371 221 A1

1033 g of fibre grade polyethylene terephthalate was heated under a nitrogen blanket under reflux together with 950 g of diethylene glycol and 1.2 g of dibutyl tin oxide to 220° C. under stirring until a homogeneous mixture was obtained. 442 g of a mixture of a mass fraction of 85% of dipropylene 1,2-glycol and 15% of tripropylene 1,2-glycol was added, and stirring was continued for approximately three hours. 703 g of maleic anhydride were then added and the mixture was kept at 205° C. under stirring until water formation had ceased. The resulting resin was cooled to 130° C., and then dissolved in 1 kg of styrene.

To this liquid, hydroquinone dissolved in methoxypropanol and N,N-diethyl aniline were added to yield a mixture that contained 0.05 g of hydroquinone, 0.2 g of methoxypropanol, and 0.7 g of diethyl aniline per 100 g of solid resin.

100 g of this solution were mixed with 23 g of the mixture of Example 2 under stirring. The mixture had a pot life of twelve minutes at 23° C.

The hybrid resin according to the invention has a markedly longer pot life that the comparison material. This is an important advantage especially for casting larger parts such as boat parts, wind mill blades or pool bodies.

The invention claimed is:

1. A two-pack polyester urethane hybrid resin casting resin composition comprising:
   a first constituent comprising a mixture ABCD of an unsaturated polyester ABC which has moieties derived from:
   (i) at least one alcohol A,
   (ii) a mixture of carboxylic acids B, wherein the alcohols A and carboxylic acids B form a resulting polyester AB having an acid number of at least 15 mg/g, and wherein at least 10% of the mass of at least one of the carboxylic acids B or of the alcohols A have at least one olefinic unsaturation in their molecules; and
   (iii) a monoepoxide C having at least four carbon atoms, which polyester ABC is dissolved in a compound D having at least one olefinic unsaturation and being radically copolymerisable with the unsaturated polyester ABC; and
   a second constituent comprising a liquid component EF comprising a polyfunctional isocyanate E and a radical initiator F.

2. The two-pack polyester urethane hybrid resin casting resin composition of claim 1 wherein the first constituent additionally comprises a catalyst G for promoting radical formation, which catalyst G is selected from the group consisting of aromatic amines and metal salts.

3. The two-pack polyester urethane hybrid resin casting resin composition of claim 1 wherein the amount of alcohols A, carboxylic acids B, and monoepoxides C are chosen in a way to ensure that in the resulting polyester ABC, substantially all of the carboxyl groups are consumed by reaction with the monoepoxide C.

4. The two-pack polyester urethane hybrid resin casting resin composition of claim 1 wherein the monoepoxide is selected from the group consisting of the glycidyl and methyl glycidyl esters of branched aliphatic carboxylic acids having from 5 to 20 carbon atoms.

5. A process for the production of a two-pack polyester urethane hybrid casting resin composition according to claim 1, comprising the steps of
    reacting at least one alcohol A and a mixture of carboxylic acids B as defined in claim 1 to form an unsaturated polyester AB,
    reacting the acidic unsaturated polyester AB formed in the first step with a monoepoxide C as defined in claim 1 to form a hydroxy functional polyester oligomer ABC,
    dissolving the polyester ABC in a liquid compound D as defined in claim 1 to form a solution of a hydroxy functional polyester oligomer ABCD, and
    adding a liquid isocyanate composition EF as defined in claim 1 to the mixture ABCD to form a casting resin composition.

6. A process for the production of a two-pack polyester urethane hybrid casting resin composition according to claim 1, comprising the steps of
    reacting at least one alcohol A and a mixture of carboxylic acids B as defined in claim 1, to form an unsaturated polyester AB,
    dissolving the acidic polyester AB in a liquid compound D as defined in claim 1,
    reacting the acidic unsaturated polyester AB dissolved in D with a monoepoxide C as defined in claim 1, to form a solution of a hydroxy functional polyester oligomer ABCD, and
    adding a liquid isocyanate composition EF as defined in claims 1 to the mixture ABCD to form a casting resin composition.

7. The process of claim 5 further comprising adding a catalyst G to the solution of the hydroxy functional polyester oligomer ABCD to promote radical formation in the radical initiator F.

8. A method of use of the two-pack polyester urethane hybrid resin casting resin composition of claim 1 for the fabrication of moulded parts comprising
    mixing the unsaturated polyester oligomer ABC as defined in claim 1 with a compound D as defined in claim 1,
    adding thereto the liquid component EF as defined in claim 1,
    casting the mixture thus obtained into a mould,
    heating the mould to cure the contents of the mould to form a cured part,
    opening the mould, and
    removing the cured part.

9. The method of claim 8 further comprising adding a catalyst G to the mixture of ABCD to promote radical formation.

10. The process of claim 6 further comprising adding a catalyst G to the solution of the hydroxy functional polyester oligomer ABCD to promote radical formation in the radical initiator F.

* * * * *